(12) United States Patent
Oak

(10) Patent No.: US 8,045,199 B2
(45) Date of Patent: Oct. 25, 2011

(54) METHOD AND SYSTEM TO SHARE AN IMAGE FORMING APPARATUS AMONG A PLURALITY OF HOSTS

(75) Inventor: Seung-soo Oak, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1294 days.

(21) Appl. No.: 11/703,713

(22) Filed: Feb. 8, 2007

(65) Prior Publication Data

US 2008/0024815 A1    Jan. 31, 2008

(30) Foreign Application Priority Data

Jul. 25, 2006   (KR) .................. 10-2006-0069494

(51) Int. Cl.
  *G06F 15/00*  (2006.01)
  *G06F 3/12*   (2006.01)
  *G06K 1/00*   (2006.01)
  *G06K 15/00*  (2006.01)
(52) U.S. Cl. ..................... 358/1.15; 358/1.14
(58) Field of Classification Search ............ 358/1.1, 358/1.15, 1.13, 1.14
See application file for complete search history.

(56) References Cited

U.S. PATENT DOCUMENTS

| | | | |
|---|---|---|---|
| 2003/0236064 A1* | 12/2003 | Shiohara et al. | 455/1 |
| 2005/0276253 A1 | 12/2005 | Ho et al. | |
| 2006/0128360 A1* | 6/2006 | Hibino | 455/411 |
| 2006/0282557 A1* | 12/2006 | Ogasawara | 710/22 |

FOREIGN PATENT DOCUMENTS

| KR | 1020050105900 | 11/2005 |
|---|---|---|
| KR | 1020050118642 | 12/2005 |

OTHER PUBLICATIONS

Korean Office Action issued Feb. 18, 2011 in KR Application No. 10-2006-0069494.

* cited by examiner

*Primary Examiner* — Douglas Tran
(74) *Attorney, Agent, or Firm* — Stanzione & Kim, LLP

(57) ABSTRACT

A method and a system to share an image forming apparatus among a plurality of hosts. The method includes generating a print enable signal to be transmitted to one of the plurality of hosts corresponding to an order of forming communication channels among one or more hosts to enable wireless communication, and performing a print job by enabling the host that receives the print enable signal to transmit print data to the image forming apparatus. Accordingly, the image forming apparatus such as a printer or multi-purpose tray is wirelessly connected to the plurality of hosts to perform print jobs and scanning jobs.

27 Claims, 4 Drawing Sheets

METHOD AND SYSTEM TO SHARE AN IMAGE FORMING APPARATUS AMONG A PLURALITY OF HOSTS

CROSS-REFERENCE TO RELATED APPLICATIONS

This application claims priority under 35 U.S.C. §119(a) of Korean Patent Application No.10-2006-0069494, filed on Jul. 25, 2006, in the Korean Intellectual Property Office, the disclosure of which is incorporated herein in its entirety by reference.

BACKGROUND OF THE INVENTION

1. Field of the Invention

The present general inventive concept relates to print jobs in an image forming apparatus such as a printer or multi-purpose tray, and more particularly, to a method and a system to share an image forming apparatus among a plurality of hosts and enabling wireless communication with the image forming apparatus.

2. Description of the Related Art

Wireless universal serial bus (USB) is a protocol used to transfer data by connecting a host to up to 127 devices. The wireless USB adds the convenience of wireless operation to the performance and security of a wired USB, and uses a star topology in which the host is directly connected to the devices by point-to-point connections. A combination of a wireless USB host and plural wireless USB devices are referred to as a cluster. Unlike a wired USB, a wireless USB has no hub in its connection structure. The wireless USB host initiates and schedules data transfers to the devices in the cluster, allotting time slots and bandwidth to each of the connected devices. Clusters can physically overlap with minimal interference, and therefore can coexist in the same wireless cell. The wireless USB employs an ultra-wideband (UWB) wireless transmission medium. The advantages of using UWB include high speed transmission, low power consumption, resistance to wiretapping, a high level of transmission security, and accurate position sensing.

An important goal of the wireless USB is to ensure easy installation and operation. Toward that end, the wireless USB standard will support the following features. The wireless USB will be fully backward compatible with the one billion wired USB connections already in operation. Moreover, wireless USB will be compatible with current USB drivers and firmware and provide bridging from wired USB devices and hosts. At launch, the wireless USB will provide speeds of up to 480 Mbps, which is comparable to a wired USB 2.0 standard and high enough to provide wireless transfer of rich digital multimedia formats. As UWB technology and process technology evolve, bandwidth may exceed 1 Gbps.

Since a current wireless USB protocol standard uses an existing wired USB protocol, the current wireless USB protocol is easily applied to products, but the full advantages of wireless USB cannot be provided. For example, the wired USB protocol enables one USB host to be connected to a plurality of peripheral devices through a hub to transfer data between the USB host and the peripheral devices. However, though the wireless USB protocol enables the host to be connected to a plurality of nearby devices, it is possible to communicate only between an initially assigned host and devices. That is, in order to connect a device to a plurality of hosts, it is necessary to reset environments by assigning each new host to be connected. When the device is an image forming apparatus, and a plurality of hosts request the image forming apparatus to print, it is necessary to reset network environments by assigning each host.

SUMMARY OF THE INVENTION

The present general inventive concept provides a method and a system to share an image forming apparatus among a plurality of hosts, in which the image forming apparatus, such as a printer or multi-purpose tray with a wireless USB function, is wirelessly connected to the plurality of hosts to perform print jobs and scanning jobs.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing a method of sharing an image forming apparatus among a plurality of hosts, the method including generating a print enable signal to be transmitted to one of the plurality of hosts corresponding to an order of forming communication channels among one or more hosts to enable wireless communication, and performing a print job by enabling the host that receives the print enable signal to transmit print data to the image forming apparatus.

The foregoing and/or other aspects and utilities of the present general inventive concept may also be achieved by providing a system to share an image forming apparatus among a plurality of hosts, the system including an image forming apparatus to generate and transmit a print enable signal to one of the plurality of hosts corresponding to an order of forming communication channels among one or more hosts to enable wireless communication and one or more hosts to transmit print data to the image forming apparatus in response to the print enable signal received from the image forming apparatus, in which the image forming apparatus performs a print job with respect to the received print data.

The foregoing and/or other aspects and utilities of the present general inventive concept may also be achieved by providing a computer-readable recording medium having embodied thereon a computer program to execute a method of sharing an image forming apparatus among a plurality of hosts, the method including generating a print enable signal to be transmitted to one of the plurality of hosts corresponding to an order of forming communication channels among one or more hosts to enable wireless communication, and performing a print job by enabling the host that receives the print enable signal to transmit print data to the image forming apparatus.

The foregoing and/or other aspects and utilities of the present general inventive concept may also be achieved by providing a method of communicating between an image forming apparatus and a plurality of hosts, the method including generating and transmitting a print enable signal to a predetermined host according to a predetermined order of forming communication channels among a plurality of hosts, receiving a print request signal from the predetermined host, forming a communication channel with the predetermined host upon receiving the print request signal, and receiving print data to be printed from the predetermined host via the communication channel.

The foregoing and/or other aspects and utilities of the present general inventive concept may also be achieved by providing a_method of forming an image with print data received from a predetermined host among a plurality of hosts in a wireless network, the method including determining an order of forming communication channels among the plurality of hosts, transmitting a print enable signal to the predetermined host at a top of the order, and printing a print job when print data is received from the predetermined host in which the print enable signal is transmitted.

The foregoing and/or other aspects and utilities of the present general inventive concept may also be achieved by providing an image forming apparatus including a control unit to transmit a print enable signal to a predetermined host in a predetermined order, to receive a print request signal from the predetermined host, to form a communication channel with the host in which the print request signal is received, and to receive print data from the predetermined host via the communication channel, and a print unit to form an image from the print data.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
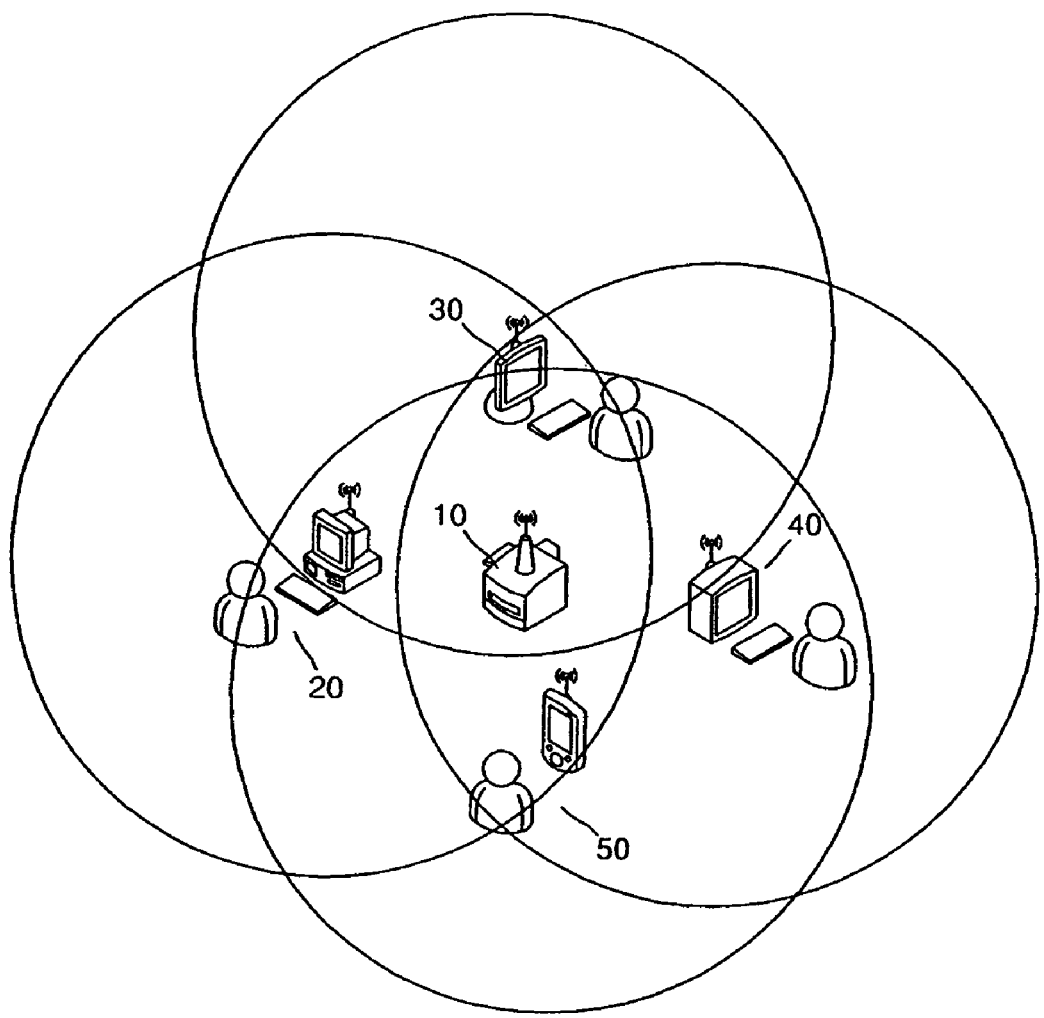
FIG. 1 illustrates a topology of a network in which a plurality of hosts share an image forming apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a topology of a network in which a plurality of hosts share an image forming apparatus. In FIG. 1, first to fourth hosts 20 to 50 are located within communication range of an image forming apparatus 10. The image forming apparatus 10 has the same beacon period in a selected communication channel. The hosts may be PCs, PDAs, notebooks, digital cameras, or mobile devices for mobile communications. Operation of the image forming apparatus of the present general inventive concept will now be described with reference to FIGS. 2, 3, and 4.

Figure 2:
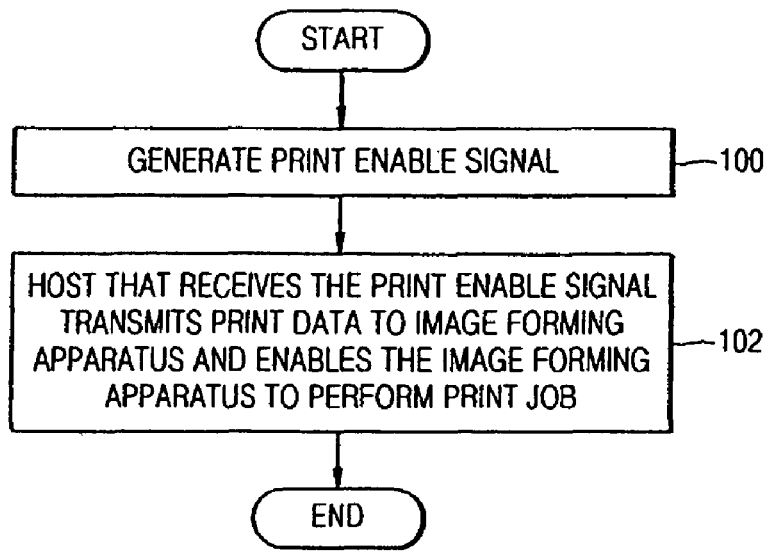
FIG. 2 is a flowchart illustrating a method of sharing an image forming apparatus among a plurality of hosts according to an embodiment of the present general inventive concept.

FIG. 2 is a flowchart illustrating a method of sharing an image forming apparatus among a plurality of hosts according to an embodiment of the present general inventive concept.

The image forming apparatus generates a print enable signal to be transmitted to a host corresponding to an order of forming communication channels (operation 100). The order of forming communication channels is an order in which channels are allocated for wireless communication between the plurality of hosts and the image forming apparatus. The print enable signal indicates that a print job can be performed by the image forming apparatus. The print enable signal may also be generally referred to as a free token signal.

Figure 3:
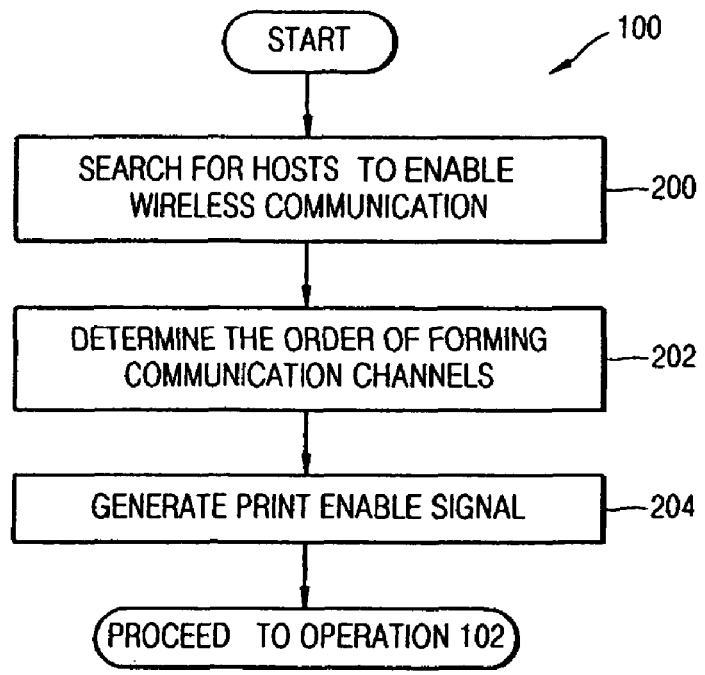
FIG. 3 is a flow chart illustrating operation 100 of FIG. 2 according to an embodiment of the present general inventive concept.

FIG. 3 is a flow chart illustrating operation 100 of FIG. 2 according to an embodiment of the present general inventive concept.

Referring to FIG. 3, hosts which enable wireless communication are searched for (operation 200), among the hosts located in the network of the image forming apparatus. For example, the first to fourth hosts 20 to 50 located in the network of the image forming apparatus 10 illustrated in FIG. 1 are searched for.

After operation 200, the order of forming communication channels with the searched hosts is determined (operation 202). For example, when the first to fourth hosts 20 to 50 located in the periphery of the image forming apparatus 10 illustrated in FIG. 1 are searched, the order of forming communication channels for wireless communication between the first to fourth hosts 20 to 50 and the image forming apparatus 10 may be determined so that the first host 20 is the first, the second host 30 is the second, the third host 40 is the third, and the fourth host 50 is the fourth.

The order of forming communication channels may be determined in accordance with distances between the image forming apparatus and the hosts. The hosts that are closer to the image forming apparatus are placed higher in the order, and the hosts that are farther from the image forming apparatus are placed lower. Alternatively, the order of forming communication channels may be determined in accordance with frequencies of performing print jobs of the hosts. The hosts that request print jobs more frequently are placed higher in the order, and the hosts that request print jobs less frequently are placed lower.

After operation 202, the print enable signal, i.e. the free token signal, is generated (operation 204).

After operation 100, the host that receives the print enable signal transmits print data to the image forming apparatus and enables the image forming apparatus to perform the print job (operation 102).

Figure 4:
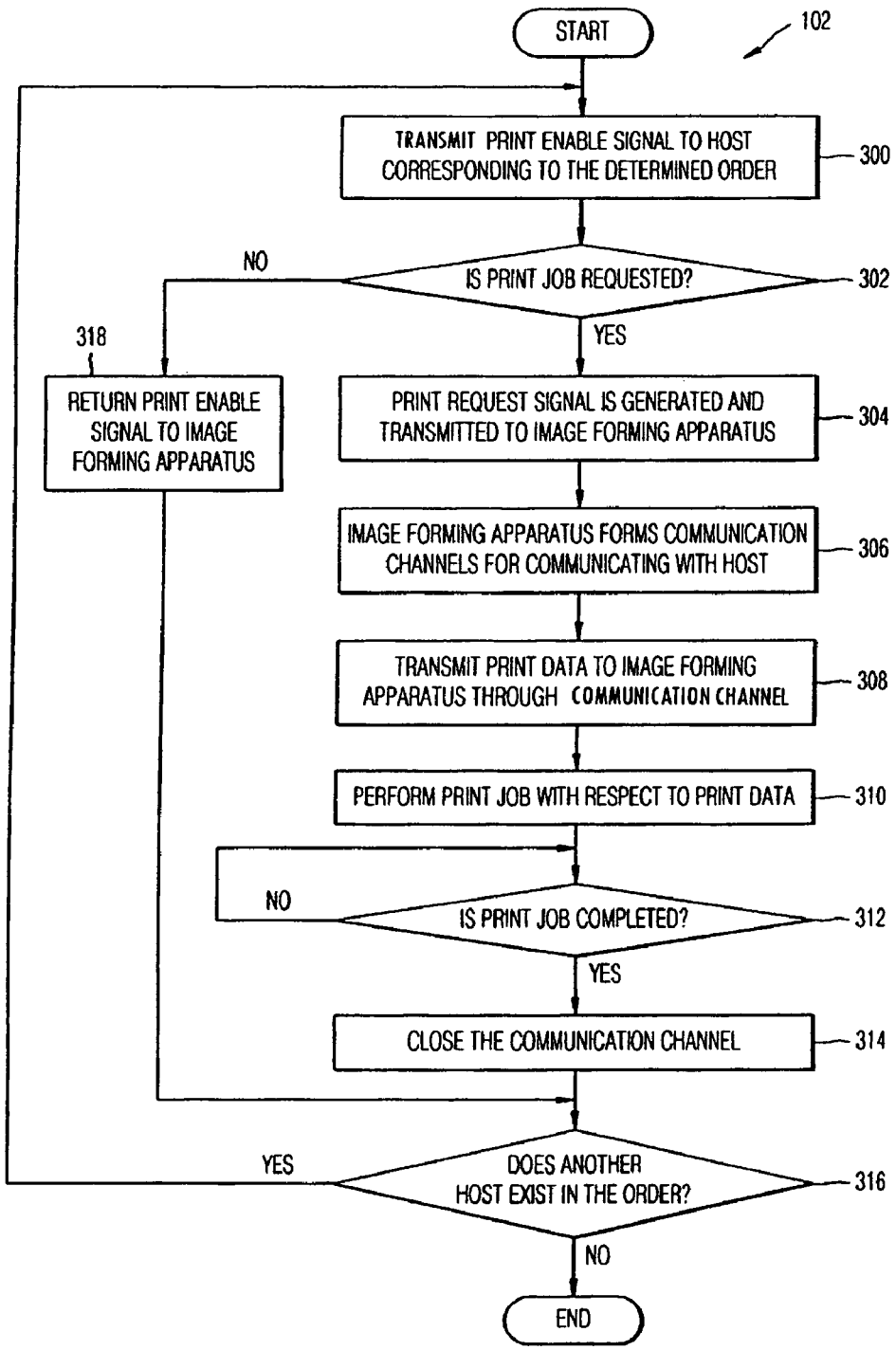
FIG. 4 is a flowchart illustrating operation 102 of FIG. 2 according to an embodiment of the present general inventive concept.

FIG. 4 is a flowchart illustrating operation 102 of FIG. 2 according to an embodiment of the present general inventive concept.

Referring to FIG. 4, the print enable signal is transmitted to the host according to the determined order (operation 300). For example, when the order of the first to fourth hosts 20 to 50 illustrated in FIG. 1 is determined so that the first host 20 is the first, the second host 30 is the second, the third host 40 is the third, and the fourth host 50 is the fourth, the print enable. signal is transmitted to the first host 20 corresponding to the first among the first to fourth hosts 20 to 50.

After operation 300, the host that receives the print enable signal checks whether a print job is requested (operation 302). For example, when the first host 20 illustrated in FIG. 1 receives the print enable signal from the image forming apparatus 10, the first host 20 checks whether a print job is requested by a user.

When a print job is requested, the host that receives the print enable signal generates and transmits a print request signal to the image forming apparatus (operation 304). In this case, the print request signal is generated by the host in order to request the image forming apparatus to print. The print request signal is referred to as a busy token signal. The busy token signal is generated by converting the free token signal. For example, when the first host 20 that receives the print enable signal receives a request for a print job from a user, the first host 20 generates the print request signal by using the print enable signal. The print request signal is transmitted to the image forming apparatus 10 that transmitted the print enable signal.

After operation 304, the image forming apparatus that received the print request signal forms the communication channel with the host that transmitted the print request signal (operation 306). The image forming apparatus that received the print request signal forms the communication channel in order to receive the print data from the host. For example, when the first host 20 transmits the print request signal to the image forming apparatus 10, the image forming apparatus 10 forms the communication channel with the first host 20. Since the formation of the communication channel is a general technique for wireless communication, its detailed description will be omitted.

After operation 306, the host that received the print request signal transmits the print data to the image forming apparatus through the communication channel (operation 308). For example, when the first host 20 forms the communication channel with the image forming apparatus 10, the first host 20 transmits the print data requested to be printed by the user to the image forming apparatus 10 through the communication channel.

After operation 308, the image forming apparatus that received the print data performs the print job (operation 310). The image forming apparatus renders and prints the print data.

After operation 310, a determination is made as to whether the print job is completed (operation 312). When the host that transmitted the print data generates and transmits a transmission completion signal of the print data, which indicates that there is no more print data to be transmitted, to the image forming apparatus, the image forming apparatus uses the transmission completion signal as a reference signal to determine the completion of the print job.

When the print job is completed, the image forming apparatus closes the communication channel with the host that transmitted the print data (operation 314). Since the completion of the print job indicates that there is no more print data to be transmitted, the communication channel between the image forming apparatus and the host need not be maintained. Accordingly, when the print job is completed, the communication channel between the image forming apparatus and the host is closed.

After operation 314, a determination is made as to whether another host exists in the order following the host that received the print enable signal (operation 316). For example, in the order of the first to fourth hosts illustrated in FIG. 1, and the first host 20 received the print enable signal in operation 300, the second host 30 is checked.

When another host exists in the order, the process proceeds to operation 300. For example, when the communication channel with the first host 20 is closed, and the second host 30 exists, the print enable signal is transmitted to the second host 30 in operation 300, and the aforementioned processes are repeated. However, when the communication channel with the fourth host 50 is closed in operation 314, and it is determined that there is no fifth host, the aforementioned processes are completed.

When the host receives the print enable signal but does not receive a request for a print job, the host returns the print enable signal to the image forming apparatus together with a signal indicating that the host has not received a request for a print job (operation 318).

After operation 318, the process proceeds to operation 316. The image forming apparatus that receives the signal indicating that the host has not received a request for a print job together with the print enable signal checks whether another host exists in the order following the host that transmitted the print enable signal, and the aforementioned processes are repeated in accordance with the check result.

The method of sharing the image forming apparatus among the plurality of hosts according to the present general inventive concept can be embodied as computer readable code/instructions/programs and can be implemented in general-use digital computers that execute the code/instructions/programs using a medium, for example, a computer readable recording medium. Examples of the computer readable recording medium include magnetic storage media (e.g. ROM, floppy disks, hard disks, etc.), optical recording media (e.g. CD-ROMs, or DVDs), and storage media such as carrier waves (e.g. transmission through the Internet). The embodiments of the present general inventive concept can be embodied as media including the computer readable code so the computer readable code is distributed over network coupled computer systems and executed in a distributed fashion. Also, functional programs, code, and code segments for accomplishing the present general inventive concept can be easily construed by programmers skilled in the art to which the present invention pertains. The methods illustrated in FIGS. 2, 3, and 4 can be stored in the computer-recorded medium in a form of computer-readable codes to perform the method when the computer reads the computer-readable codes of the recording medium.

A system to share an image forming apparatus among a plurality of hosts will now be described in detail with reference to the accompanying drawings.

Figure 5:
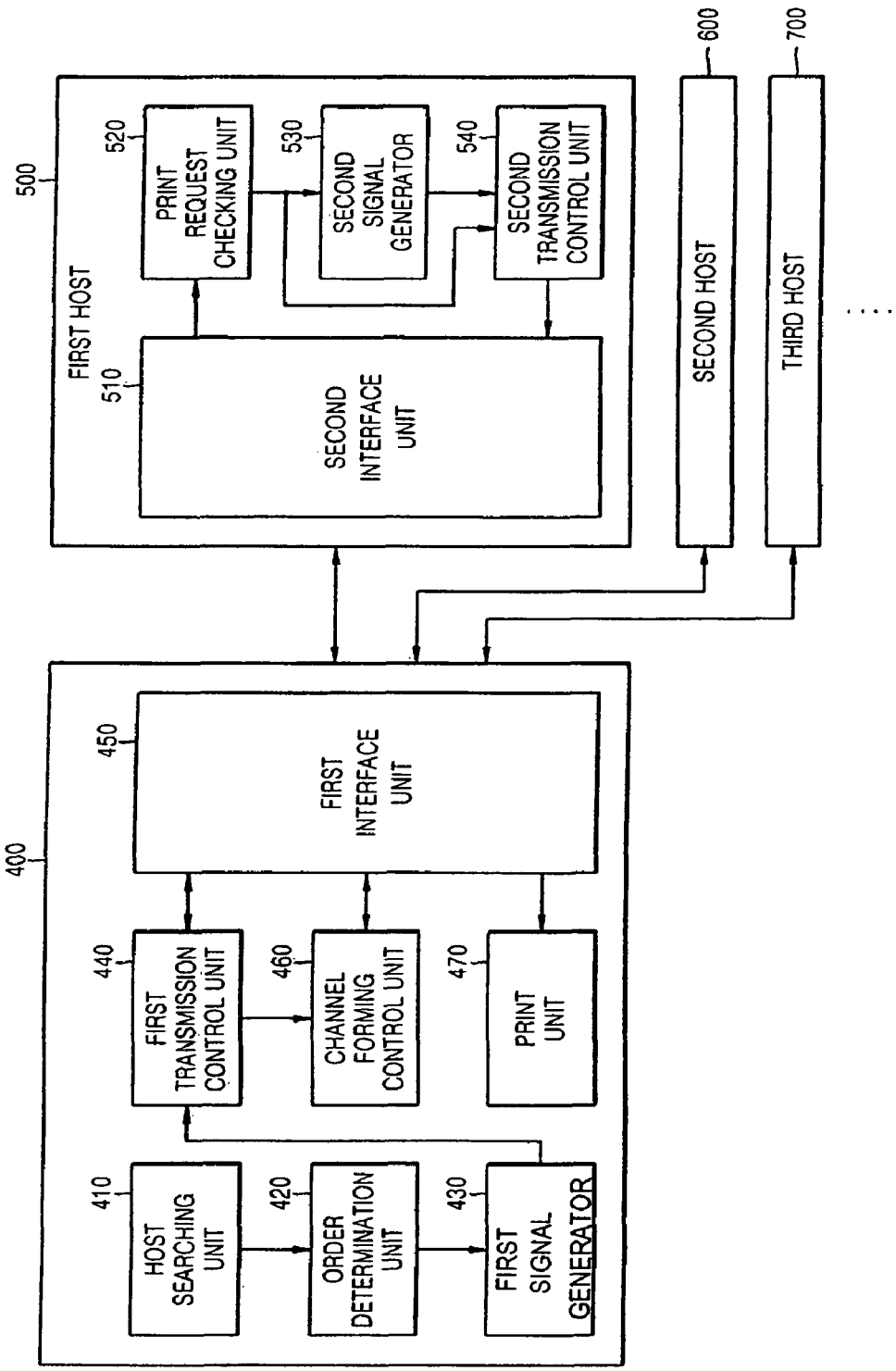
FIG. 5 is a block diagram illustrating a system in which a plurality of hosts share an image forming apparatus according to an embodiment of the present general inventive concept.

FIG. 5 is a block diagram illustrating a system in which a plurality of hosts share an image forming apparatus according to an embodiment of the present general inventive concept. The system includes an image forming apparatus 400, a first host 500, a second host 600, and a third host 700. The first host 500, the second host 600, and the third host 700 are devices to enable wireless communication with the image forming apparatus 400.

The image forming apparatus 400 generates and transmits a print enable signal to a host corresponding to the order of forming communication channels among one or more hosts to enable wireless communication. The image forming apparatus 400 includes a host searching unit 410, an order determination unit 420, a first signal generator 430, a first transmission control unit 440, a first interface unit 450, a channel forming control unit 460, and a print unit 470.

The host searching unit 410 searches for the hosts to enable wireless communication and outputs the search result to the order determination unit 420. The host searching unit 410 searches for the hosts 500, 600, and 700 to enable wireless communication among hosts located in the periphery of the image forming apparatus 400.

The order determination unit 420 determines the order of forming communication channels with the found hosts 500, 600, and 700 and outputs the determination result to the first signal generator 430. The order determination unit 420 may determine the order of forming communication channels in accordance with distances between the image forming apparatus and the hosts 500, 600, and 700. The hosts that are closer to the image forming apparatus are placed higher in the order, and the hosts that are farther from the image forming apparatus are placed lower. Alternatively, the order determination unit 420 may determine the order of forming communication channels in accordance with frequencies of print jobs of the hosts. The hosts that request print jobs more frequently are placed higher in the order, and the hosts that request print jobs less frequently are placed lower.

The first signal generator 430 generates the print enable signal, i.e. the free token signal, in response to the determination result of the order determination unit 420, and outputs the print enable signal to the first transmission control unit 440.

The first transmission control unit 440 outputs a control signal, to enable the print enable signal generated by the first signal generator 430 to be transmitted to the host corresponding to the determined order, to the first interface unit 450. For example, when the order of the first to third hosts 500, 600, and 700 is determined so that the first host 500 is the first, the second host 600 is the second, and the third host 700 is the third, the first transmission control unit 440 outputs the control signal to enable the print enable signal to be transmitted to the first host 500.

The first interface unit 450 transmits the print enable signal generated by the first signal generator 430 to the host corresponding to the determined order in accordance with the control signal of the first transmission control unit 440. The first interface unit 450 is a component to enable wireless communication with the first to third hosts 500, 600, and 700 and includes a WUSB wireless device controller (not shown), RF/baseband UWB physical layers (not shown), and an antenna (not shown). Since these components are based on existing techniques, their detailed description will be omitted.

The first to third hosts 500, 600, and 700 transmit print data to the image forming apparatus 400 in response to the print enable signal received from the image forming apparatus 400. Each of the first to third hosts 500, 600, and 700 includes a second interface unit 510, a print request checking unit 520, a second signal generator 530, and a second transmission control unit 540.

The second interface unit 510 receives the print enable signal transmitted from the image forming apparatus 400 and outputs the print enable signal to the print request checking unit 520. The second interface unit 510 includes the same components as the first interface unit 450, which are a WUSB wireless device controller (not shown), RF/baseband UWB physical layers (not shown), and an antenna (not shown).

The print request checking unit 520 checks whether the host has received a request for a print job from a user, in response to the print enable signal. The print request checking unit 520 outputs the check result indicating that the host has received a request for a print job, to the second signal generator 530. Alternatively, the print request checking unit 520 outputs the check result indicating that the host has not received a request for a print job, to the second transmission control unit 540.

The second signal generator 530 generates the print request signal in response to the check result indicating that the host has received a request for a print job, and outputs the print request signal to the second transmission control unit 540. The second signal generator 530 generates a busy token signal as the print request signal. The busy token signal is generated by converting a free token signal.

The second transmission control unit 540 outputs the control signal to enable the print request signal generated by the second signal generator 530 to be transmitted to the image forming apparatus 400, to the second interface unit 510.

The second interface unit 510 transmits the print request signal to the image forming apparatus 400, in accordance with the control signal of the second transmission control unit 540.

The image forming apparatus 400 receives the print data through the communication channel and performs the print job with respect to the received print data. The image forming apparatus 400 includes the channel forming control unit 460 and the print unit 470.

The channel forming control unit 460 outputs a signal to control the first and second interface units 450 and 510 to form a communication channel, to the first interface unit 450, in response to the print request signal received from the first host 500.

When the communication channel with the image forming apparatus 400 is formed, the second transmission control unit 540 outputs the print data to the second interface unit 510 which then transmits the print data to the image forming apparatus 400.

The print unit 470 of the image forming apparatus 400 prints the print data.

When the transmission of the print data is completed, the second signal generator generates a transmission completion signal and transmits the transmission completion signal to the image forming apparatus 400 under the control of the second transmission control unit 540.

When the print job is completed, or the transmission completion signal is received, the channel forming control unit 460 of the image forming apparatus 400 controls the image forming apparatus 400 to close the communication channel with the first host 500 that transmitted the print data.

After the print job is completed, the first transmission control unit 440 checks whether another host exists in the order following the first host 500. When another host exists in the order, the first transmission control unit 440 controls the image forming apparatus 400 to transmit the print enable signal to that host.

When the check result indicating that the first host 500 has not received a request for a print job is received from the print request checking unit 520, the second transmission control unit 530 controls the first host 500 to return the print enable signal to the image forming apparatus 400. At this time, the second transmission control unit 530 controls the first host 500 to return the signal indicating that the first host 500 has not received a request for a print job together with the print enable signal, to the image forming apparatus 400.

The method and the system to share an image forming apparatus among a plurality of hosts according to an embodiment of the present general inventive concept provides convenience by connecting the image forming apparatus, such as a printer or multi-purpose tray with a wireless USB function, to a plurality of hosts to perform printing and scanning functions.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of sharing an image forming apparatus among a plurality of hosts, the method comprising:
    generating a print enable signal to be transmitted to one of the plurality of hosts corresponding to an order of forming communication channels among one or more hosts to enable wireless communication; and
    performing a print job by enabling the host that receives the print enable signal to transmit print data to the image forming apparatus.

2. The method of claim 1, wherein the generating of the print enable signal comprises:
    searching for the hosts to enable wireless communication;

determining the order of forming communication channels with the searched hosts; and generating the print enable signal.

3. The method of claim 2, wherein in the determining of the order, the order is determined in accordance with distances between the image forming apparatus and the searched hosts, or in accordance with frequencies of performing print jobs of the searched hosts.

4. The method of claim 1, wherein the performing of the print job comprises:

transmitting the print enable signal to the host according to the determined order;

determining whether the host that receives the print enable signal has received a request for a print job;

allowing the host that receives the print enable signal to generate and transmit a print request signal to the image forming apparatus, when it is determined that the host that received the print enable signal has received a request for a print job;

allowing the image forming apparatus that receives the print request signal to form a communication channel with the host that transmitted the print request signal;

allowing the host that transmitted the print request signal to transmit the print data to the image forming apparatus through the communication channel; and allowing the image forming apparatus that receives the print data to perform the print job.

5. The method of claim 4, wherein the performing of the print job further comprises:

allowing the image forming apparatus to close the communication channel with the host that transmitted the print data after the print job of the print data is completed; and checking whether another host exists in the order following the host that received the print enable signal, and wherein when the another host exists, the print enable signal is transmitted to the another host.

6. The method of claim 5, wherein the performing of the print job further comprises:

allowing the host that transmitted the print data to generate and transmit a transmission completion signal to the image forming apparatus, and wherein the image forming apparatus closes the communication channel with the host that transmitted the print data, in response to the transmission completion signal.

7. The method of claim 4, wherein the allowing of the image forming apparatus to perform the print job further comprises:

allowing the host that received the print enable signal to return the print enable signal to the image forming apparatus, when the host that received the print enable signal has not received a request for a print job; and allowing the image forming apparatus to check whether another host exists in the order following the host that received the print enable signal, and wherein when the another host exists, the print enable signal is transmitted to the another host.

8. The method of claim 7, wherein in the allowing of the host to return the print enable signal to the image forming apparatus, a signal indicating that the host has not received a request for a print job is transmitted together with the print enable signal to the image forming apparatus.

9. A computer-readable recording medium having embodied thereon a computer program to execute a method of sharing an image forming apparatus among a plurality of hosts, the method comprising:

generating a print enable signal to be transmitted to one of the plurality of hosts corresponding to an order of forming communication channels among one or more hosts to enable wireless communication; and performing a print job by enabling the host that receives the print enable signal to transmit print data to the image forming apparatus.

10. A system to share an image forming apparatus among a plurality of hosts, the system comprising:

an image forming apparatus to generate and transmit a print enable signal to one of the plurality of hosts corresponding to an order of forming communication channels among one or more hosts to enable wireless communication; and one or more hosts to transmit print data to the image forming apparatus in response to the print enable signal received from the image forming apparatus, wherein the image forming apparatus performs a print job with respect to the transmitted print data received from the one or more hosts.

11. The system of claim 10, wherein the image forming apparatus comprises:

a host searching unit to search for the hosts to enable wireless communication;

an order determination unit to determine an order of forming communication channels with the searched hosts;

a first signal generator to generate the print enable signal;

a first transmission control unit to control the image forming apparatus to transmit the print enable signal to the host according to the determined order; and a first interface unit to transmit the print enable signal to the host according to the determined order, under the control of the first transmission control unit.

12. The system of claim 11, wherein the order determination unit determines the order of forming communication channels in accordance with distances between the image forming apparatus and the hosts found by the host searching unit, or in accordance with frequencies of performing print jobs of the hosts found by the host searching unit.

13. The system of claim 11, wherein each of the hosts comprises:

a print request checking unit to check whether the host has received a request for a print job, in response to the print enable signal;

a second signal generator to generate the print request signal when the host has received a request for a print job;

a second transmission control unit to control the host to transmit the print request signal and the print data to the image forming apparatus; and a second interface unit to transmit the print request signal and the print data to the image forming apparatus in accordance with the control of the second transmission control unit.

14. The system of claim 13, wherein the image forming apparatus comprises:

a channel forming control unit to control the first and second interface units to form a communication channel or to close the communication channel after the print job with respect to the print data is completed; and a print unit to print the print data received through the communication channel.

15. The system of claim 11, wherein the first transmission control unit controls the image forming apparatus to check whether another host exists in the order following the host that received the print enable signal, and transmits the print enable signal to the another host when the another host exists.

16. The system of claim 14, wherein the second signal generator generates a transmission completion signal of the print data, and wherein the channel forming control unit controls the image forming apparatus to close the communication channel with the host that transmitted the print data in response to the transmission completion signal.

17. The system of claim 13, wherein when the host has not received a request for a print job, the second transmission control unit controls the host to return the print enable signal to the image forming apparatus, and wherein the first transmission control unit controls the image forming apparatus to check whether another host exists in the order following the host that received the print enable signal, and transmit the print enable signal to the another host when the another host exists.

18. The system of claim 17, wherein the second transmission control unit controls the host to return the signal indicating that the host has not received a request for a print job together with the print enable signal, to the image forming apparatus.

19. A method of communicating between an image forming apparatus and a plurality of hosts, the method comprising:

generating and transmitting a print enable signal to a predetermined host according to a predetermined order of forming communication channels among a plurality of hosts;

receiving a print request signal from the predetermined host;

forming a communication channel with the predetermined host upon receiving the print request signal; and receiving print data to be printed from the predetermined host via the communication channel.

20. The method of claim 19, wherein the predetermined host comprises one of a personal computer (PC), a personal digital assistant (PDA), a notebook PC, a digital camera, or other mobile communications device.

21. The method of claim 19, further comprising:

determining if another host exists in the predetermined order;

transmitting the print enable signal to the another host if the another host exists;

receiving a transmission completion signal; and closing the communication channel in response to receiving the transmission completion signal.

22. A method of forming an image with print data received from a predetermined host among a plurality of hosts in a wireless network, the method comprising:

determining an order of forming communication channels among the plurality of hosts;

transmitting a print enable signal to the predetermined host at a top of the order; and printing a print job when print data is received from the predetermined host in which the print enable signal is transmitted.

23. The image forming method of claim 22, further comprising:

closing the communication channel with the host in which the print data was received after the print job is performed; and repeating the transmitting and printing operations for each host in the order.

24. An image forming apparatus comprising:

a control unit to transmit a print enable signal to a predetermined host in a predetermined order, to receive a print request signal from the predetermined host, to form a communication channel with the host in which the print request signal is received, and to receive print data from the predetermined host via the communication channel; and a print unit to form an image from the print data received.

25. The image forming apparatus of claim 24, further comprising:

an interface unit to transmit the print enable signal to the predetermined host and to receive the print request signal and the print data from the predetermined host.

26. The image forming apparatus of claim 25, wherein the control unit comprises:

a transmission controller to transmit a control signal and the print enable signal to the interface unit; and a channel forming control unit to form the communication channel in the predetermined order.

27. The image forming apparatus of claim 25, wherein the interface unit is a wireless universal serial bus (WUSB) wireless device controller using an ultrawideband (UWB) transmission medium.

* * * * *